Dec. 29, 1970 R. I. SKINNER 3,550,437
ACCELEROGRAPHS AND ACCELEROMETERS
Filed Jan. 21, 1966
3 Sheets-Sheet 1

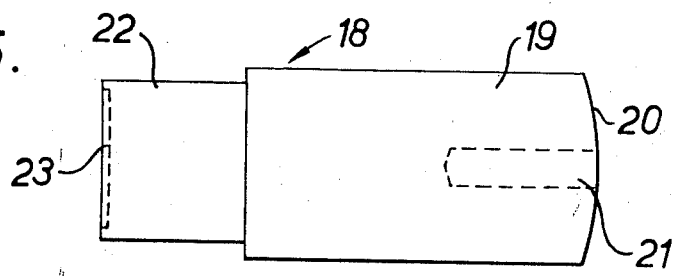
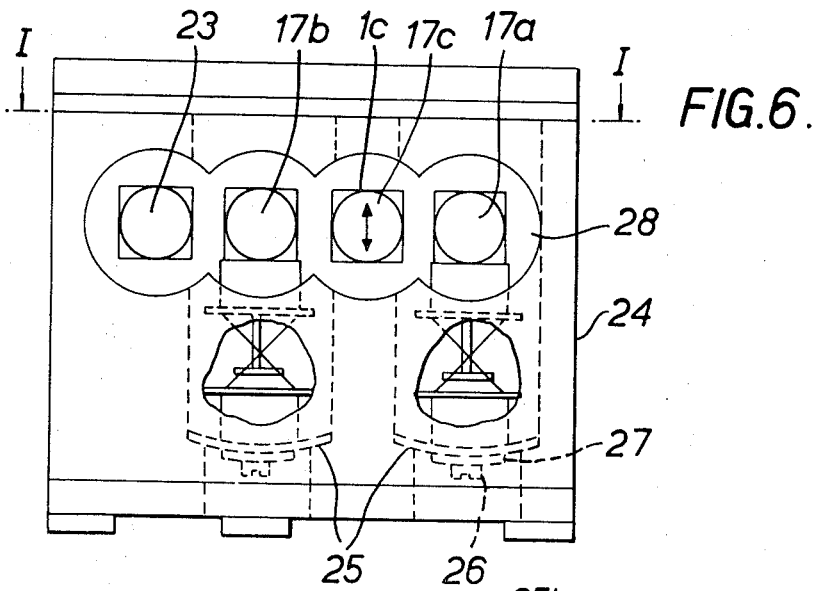
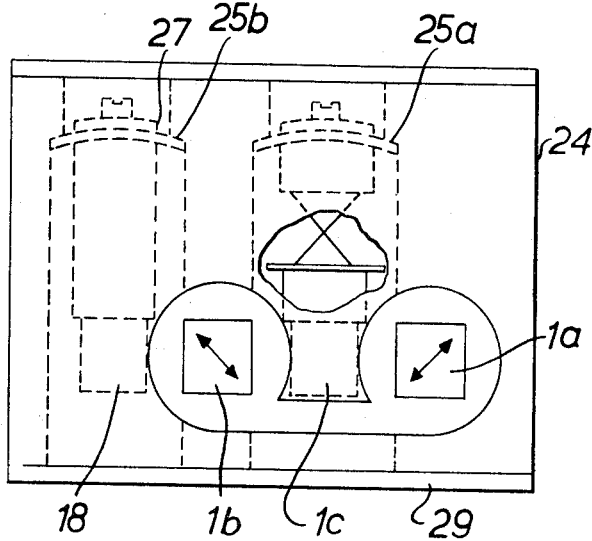

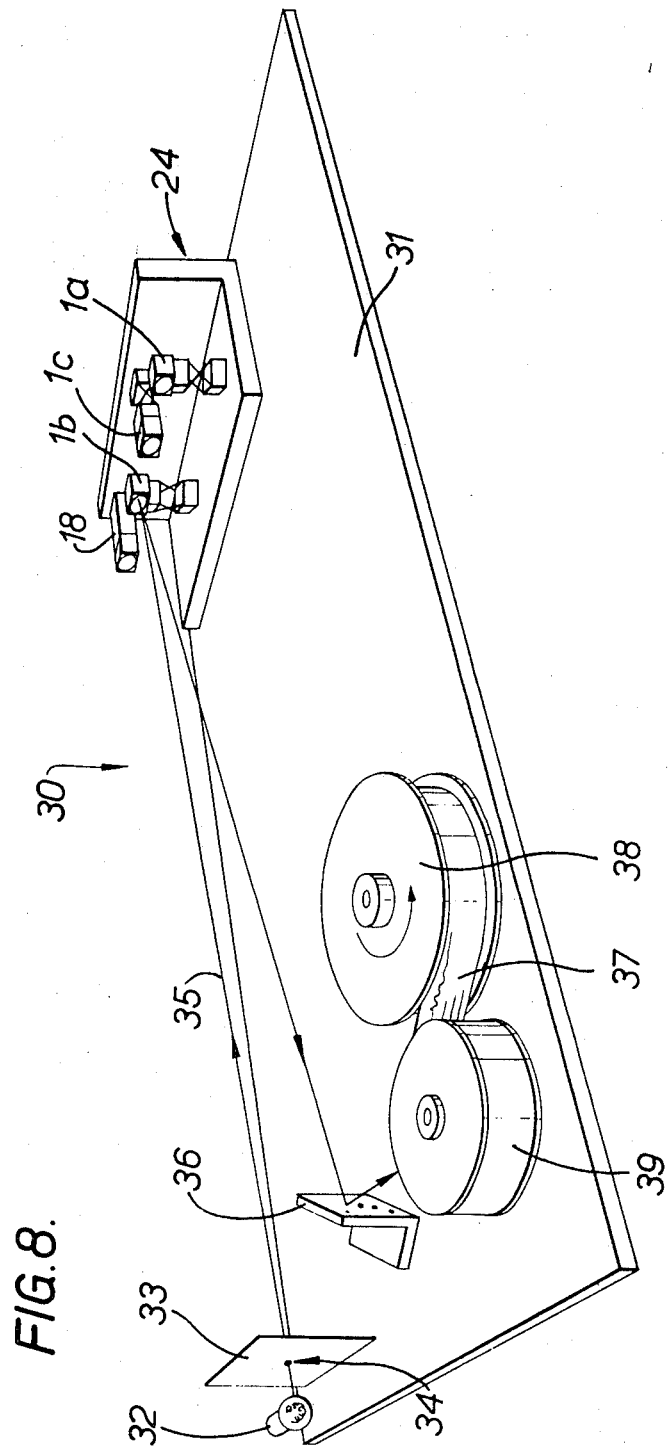

United States Patent Office 3,550,437
Patented Dec. 29, 1970

3,550,437
ACCELEROGRAPHS AND ACCELEROMETERS
Robert Ivan Skinner, Silverstream, Wellington, North Island, New Zealand, assignor to New Zealand Government Property Corporation, Wellington, North Island, New Zealand, a corporation of New Zealand
Filed Jan. 21, 1966, Ser. No. 522,225
Int. Cl. G01p *1/06, 15/02*
U.S. Cl. 73—71.3                           6 Claims

ABSTRACT OF THE DISCLOSURE

An accelerometer comprising a base member and a movable mass which includes a glass cube having a spherical mirror formed on one of its faces. The movable mass is movably supported in a spaced relationship from the base member by resilient strut support means. Also, damping means for applying a force to the movable mass proportional to the velocity of the moving mass and in the opposite direction are provided. The resilient strut support means comprises two pairs of crossed but separated wires, each pair of wires inclined in opposite directions and each wire contained in a plane parallel to the planes of any of the other wires. The two pairs of wires are positioned towards either side of the movable mass, and the axis of rotation of the movable mass extends through the points of intersection of the crossed wires when in rest position. The movable mass may be vibrated through an arcuate path and the crossed pairs of wires resist arcuate movement in any other direction other than about the axis of rotation.

---

This invention relates to accelerographs and/or accelerometers particularly though not solely for use in said accelerographs.

I believe a considerable demand exists for a strong motion accelerograph of high performance and low cost. These accelerographs should be installed extensively throughout seismic regions to gather the primary data required for the efficient design of earthquake resistant structures. Existing accelerographs have the accelerometers thereof mounted in a variety of ways, for example using a mounting similar to that used in galvanometers with a support rod between jewelled pivots with a restoring spring. This construction however is not completely satisfactory because of the friction in the pivots which results in some errors in the recorded movement of the accelerometer. In a further known form of mounting the movable mass in the accelerometer is supported on a tensioned wire but such a form of mounting has the disadvantage of allowing the mass to move in other directions than that being recorded thus also introducing irregularities.

It is therefore an object of the present invention to provide accelerographs and/or accelerometers particularly for use in the accelerographs which will considerably reduce the abovementioned disadvantages.

It is a further object of the present invention to provide an accelerometer with the movable mass supported by a substantially frictionless hinge means to rotate about one axis only.

It is a yet further object to incorporate a spring force in the mounting to reposition the mass.

It is a further object to provide an accelerometer having a mounting as aforesaid and incorporating damping means to restrain the movement of the movable mass.

It is a further object of the present invention to provide an accelerograph incorporating accelerometers as aforesaid which will allow a single pin-hole source of light to illuminate all the accelerometers used in the accelerograph without requiring any secondary mirrors.

Figure 1:
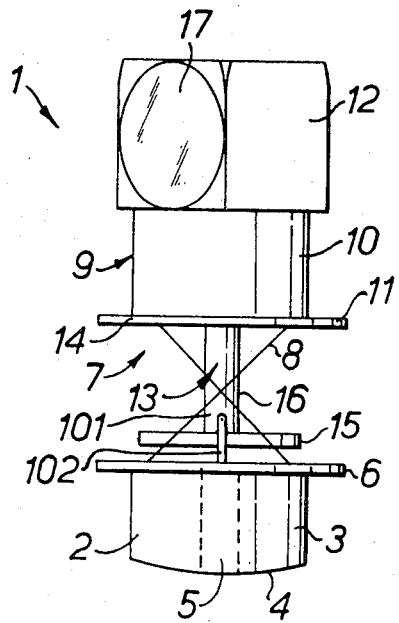
Figure 2:
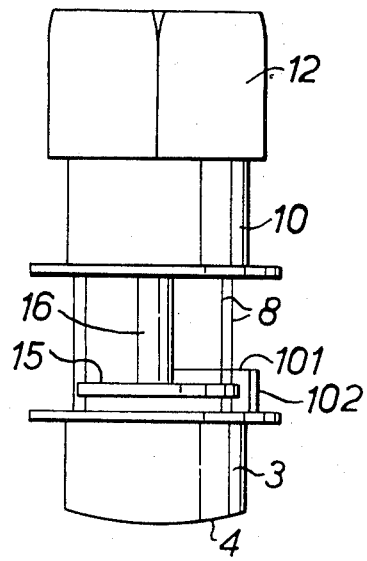
Figure 4:
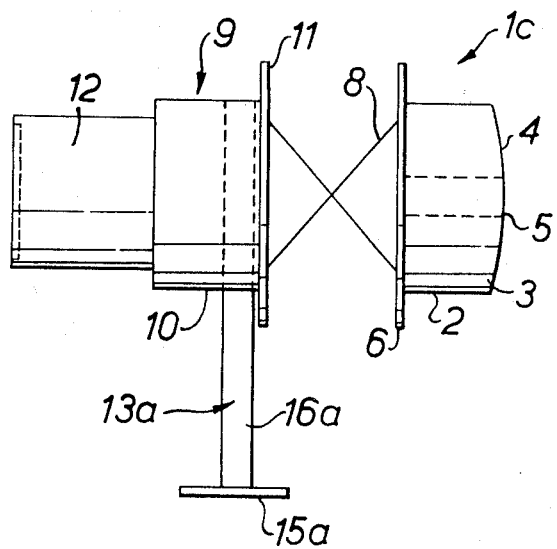
Figure 3:
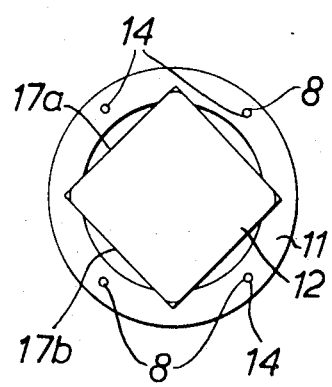

One preferred form of the invention will now be described with reference to the accompanying drawings in which:

FIG. 1 is an elevation of an accelerometer according to the present invention,
FIG. 2 is a side elevation of FIG. 1,
FIG. 3 is a plan view of FIG. 1,
FIG. 4 is an elevation of a modified accelerometer arranged to be horizontally mounted,
FIG. 5 is an elevation of a fixed reference mirror,
FIG. 6 is an elevation of the housing showing the accelerometers and fixed reference mirror mounted in position,
FIG. 7 is a view through I—I of FIG. 6, and
FIG. 8 is a diagrammatic layout of an accelerograph according to the present invention.

In the preferred form of the invention an accelerometer 1 is constructed as follows:

A base member 2 has a main cylindrical body portion 3 with a spherical seating face 4 and a centrally positioned threaded aperture 5 provided therethrough. The base member 2 is completed by a circular top plate 6 attached to the cylindrical body portion 3 by any suitable means.

A resilient strut support means 7 extends from the base member 2 and comprises four crossed but separated resilient strut members 8. The strut members 8 are arranged in two pairs of parallel struts with each pair of struts inclined in opposite directions and with each strut substantially positioned in a plane parallel to the planes containing each of the remaining struts. The struts 8 support a movable mass 9 and provide a crossed or camp-stooled configuration adjacent either side of the movable mass which will be described in detail herebelow.

In this way the movable mass 9 is supported about an axis of rotation to allow the mass to be vibrated through a rotary path while at the same time resisting any rotary movement in any other direction.

As was above stated the strut members 8 must be resilient members capable of supporting the mass 9. We have found suitable struts may be provided by beryllium copper wire, eight-thousandths of an inch in diameter, for example hard drawn mallory 73.

The performance of the accelerometer is substantially improved and its cost of manufacture is reduced by introducing a fifth resilient strut support between the base member 2 and the movable mass 9. This fifth strut is to prevent movement of the mass in the direction of the axis of rotation. A convenient position for the fifth strut is near the axis of rotation and parallel to it, FIG. 2. The ends of the fifth strut 101 are fixed to 16 and to a post 102 mounted on 6.

The positions of the ends of the five struts is much less critical than the positions of the ends of the four struts which remain when strut 101 is removed. Permissible errors in the end positions of the five struts may change somewhat their lengths and directions. Preventing movement of the mass 9 along the axis of rotation by strut 101 improves the performance of the accelerometer while the lower precision required during manufacture and assembly reduces its cost.

The preferred length of the fifth resilient strut 101 is an eighth of an inch and its preferred diameter is six-thousandths of an inch.

It is possible to omit the fifth strut 101.

It should then be noted that while for all practical purposes it is desirable to have each of the struts 8 in parallel planes if a sufficiently precise standard of workmanship can be obtained a small departure from parallelism can be introduced to cancel translations caused by the linear sideways motions which may possibly occur in the movable mass supported by the crossed struts. Pairs of struts would be inclined slightly inwardly so that their directions intersect in a plane through the surface of the recording film. The mass would then twist a little to cancel the translation caused by the linear movement. Once again however it is stressed that a very high degree of precision workmanship would be necessary for this modified mounting to be effective.

The movable mass 9 comprises a cylindrical section 10 having a circular plate 11 fixed to the lower end thereof, a glass cube 12 fixed to the upper end thereof and a damping means 13.

The plates 6 and 11 have apertures 14 drilled therethrough and these apertures are arranged in use to receive the ends of the inclined strut wires 8 which are fixed thereto by solder with the aid of a suitable assembly jig. It will be appreciated accelerometer 1 will require to be assembled by a skilled instrument maker.

It is necessary for the accelerometer 1 to be comparatively small so that a compact mounting may be provided in an accelerograph to be described later. The overall dimensions of the accelerometer illustrated in the accompanying drawings are approximately seven-eighths of an inch by three-eighths of an inch with the accelerometer illustrated in the accompanying drawings magnified approximately four times.

In order to ensure that there is sufficient rotary vibration the dimension between the axis of rotation through the points of intersection of the crossed struts 8 when in the rest position and the centre of mass of the movable mass 9 is between one half and one eighth of an inch and in the preferred example is approximately a quarter of an inch.

Dimensional variations in the accelerometer may be made but if the unit is made smaller the work of assembling the accelerometer would become much more difficult and if the component sizes were increased substantially the advantage of the compactness above referred to would be lost. For practical purposes the components could be increased or decreased by a factor of approximately two.

As was above stated the movable mass includes damping means 13 which must be provided to apply a force proportional to the velocity of the moving mass and in the opposite direction. A simple form of dampening means is provided by a paddle 15 attached to the shaft 16, centrally dependent from the circular plate 11 and arranged in use to move in a viscous oil contained in a housing in which the accelerometer 1 is mounted. Silicone oil provides a suitable damping liquid particularly as it is not materially affected by temperature changes.

The movable mass also includes a glass cube 12 which has a spherical mirror 17 of optical quality formed on one of the exposed faces thereof. The spherical mirror is cut back adjacent the corners of the cube to leave a circular mirror as indicated on FIG. 1.

The cube 12 is mounted with the diagonal of the cube parallel to the axis of rotation formed by the intersecting struts 8, and the mirror 17 may be provided on one or other of the faces 17a or 17b indicated in FIG. 3 allowing components of acceleration at right angles one to the other to be recorded by an accelerograph as will be described further later.

The radius of the spherical mirror is for example 12.900 inches, plus or minus 0.025 inch.

A modified accelerometer 1c is illustrated in FIG. 4. In this case the accelerometer is arranged to be mounted with the longitudinal axis positioned in the substantially horizontal plane. The components bear the same reference numerals as corresponding components in the accelerometer illustrated in FIGS. 1, 2 and 3. However with the horizontal accelerometer the damping means 13a has the shaft 16a with the paddle 15a extending from an aperture positioned in the curved bounding face of the cylindrical section 10 so that the paddle will be in the damping liquid in the housing.

It is desirable to have a fixed reference against which any variations recorded by the accelerometers above described may be compared. To this end a fixed reference mirror 18 (FIG. 5) is mounted on a pedestal 19 having a spherical seating face 20 and a threaded aperture 21 centrally positioned extending from the face 20 into the pedestal 19. A glass cube 22 is fixed to the end of the pedestal 19 and has a spherical mirror 23 on the outer face of the cube, so that in use the reference mirror is mounted with the longitudinal axis thereof in a horizontal plane.

Also the horizontal accelerometer has the spherical mirror 17c (FIG. 6) formed on the outer face of the cube 12, that is with the mirror substantially normal to the longitudinal axis through the accelerometer.

In order to form a compact component containing the accelerometers for use in an accelerograph a casing 24 (FIG. 6) is provided to mount three accelerometers and fixed reference mirror 18. The accelerometers are oriented in the housing 24 so that each responds to a separate perpendicular component of acceleration. In the preferred form they are arranged to sense the North-South, East-West and vertical acceleration components respectively. The accelerometers 1a and 1b are arranged to record the North-South and East-West components and are thus mounted vertically from spherical seats 25 provided in the housing 24. A fixing screw 26 and spherical washer 27 in the base of each seat 25, allow the accelerometers to be accurately adjusted to a normal reference recording point prior to final fixing in place. The accelerometer 1c is mounted with the longitudinal axis in a substantially horizontal plane and again has a spherical seating 25a with the spherical washer and adjustment screw as provided for the vertical accelerometers.

The fixed reference mirror 18 is similarly mounted in a spherical seat 25b. A window 28 is provided in the housing and each of the mirrors 17a, 17b, 17c and 23 are closely positioned one to the other and extend over a total lineal distance of slightly less than one and a half inches. This provides a very compact unit which may be used in an accelerograph as diagrammatically illustrated in FIG. 8.

The housing 24 is completed by a clear glass window 29 which is fixed to the housing to contain the silicone oil. The whole unit is hermetically sealed.

The accelerograph 30 (FIG. 8) comprises a suitable mounting face 31 having a light source 32 illuminating a pin-hole screen 33 to project a beam of light on to the mirrors of the units contained in the housing 24. The units are of course much closer together than indicated in FIG. 8 as is illustrated in FIGS. 6 and 7. The pin-hole 34 is approximately two-thousandths of an inch in diameter and is positioned at the radius of the spherical mirrors provided on the accelerometers and fixed reference mirror. This gives an approximate optical path of thirteen inches and at this distance the image of the light source 32 through the pin-hole 34 more than covers the four mirrors compactly positioned in the housing 24. The beam of light 35 is reflected by the mirrors to a fixed deflection mirror 36 and thence on to a recording film 37. This part of the equipment is well known in the art and is not described in detail herein.

The end of the recording film 37 is firmly attached to a take-up drum 38 and the trailing end of the film is attached to the centre of a cassette spool 39. During the recording run the film moves past the signal light spots projected by the mirrors on the accelerometers and fixed reference mirror through the optical lever above described.

Unperforated film is used as this can be drawn smoothly through the light trap of the cassette. Also it has a greater width available for recording.

The take-up drum 35 is driven at four r.p.m. by the precision D.C. motor (with gear box). This is a commercially available combination used for analogue computers which is not described herein but will provide a sufficiently accurate drive to remove the necessity for timing marks.

The record is recovered by winding it back on to the cassette spool. A slipping clutch permits the drum to turn on its drive shaft. The clutch also protects the gear box from overload.

A simple device ensures the film can readily be attached or detached from the drum or spool. The end of the film is folded back and the fold pushed into a slot in the spool until the end catches on a leaf spring. The film is then firmly held but can be detached by pushing it further in until the folded part springs open on reaching the far end of the slot.

The accelerometer preferably also includes some form of trigger equipment, for example an electromagnetic P-wave trigger. Thus a preliminary shock wave which normally precedes an earthquake will actuate the equipment and ensure it is operating to record an earthquake. After a given time the apparatus will switch off. The triggering arrangement is again a standard component and is not described in detail in this specification.

In order to adjust the accelerometers in the housing 24 the unit is assembled and an aligning screen positioned in place of the film recording equipment. Each mirror will direct a beam of light which will appear as a spot of light on the recording screen. By adjusting the accelerometers or the fixed reference mirror on their spherical seats the points of light may all be readily adjusted to the correct position so that all the light spots will lie in one line across the film. To ensure the units once correctly adjusted do not accidentally move out of adjustment a suitable bonding agent for example an epoxy resin cement is placed in the spherical seat prior to the accelerometers being fitted and adjusted. Once the adjustment is made and the bonding agent set the unit is correctly adjusted to record the acceleration components of an earthquake.

To use the accelerograph as above described incorporating accelerometers according to the present invention the accelerograph is positioned in the field and will record the various components of an earthquake. The beryllium copper wire used to support the movable mass 9 in the accelerometers gives the movable mass a natural frequency of about thirty-three cycles per second. I believe this will adequately record any of the acceleration components normally met with in earthquakes. The earthquakes will cause the movable mass to vibrate through a rotary path about the axis of rotation provided by the crossed support wires 8. The axis of rotation remains substantially through the point of intersection of the crossed wires when at their rest position. This rotary movement will also cause the mirror to rotate thus moving the point of light reflected by the mirror up and down over the recording film. The support of the movable mass and the restoring force operating on the mass during its rotation (oscillation) is solely due to the resilient struts. The particular type of mounting used in the accelerometer allows the mass to move with negligible hysteresis and avoids the potential defects associated with pivot point support. Any deflection normal to the axis of rotation is resisted and should movement take place this will not be a rotary movement and for practical purposes should not introduce errors into the path traced by the beam of light on the recording film.

Some modifications to the present invention and particularly to the accelerometers may be made. For example the wires may not necessarily be crossed at right angles as illustrated in the drawings, nor need the point of intersection between the crossed wires be centrally between the plates 6 and 11. It is necessary for there to be some symmetry of arrangement in the crossed strut members but the strut members themselves do not necessarily need to have a circular cross section. Thus ribbon strut members could be used and where a ribbon strut member was used it would be possible to provide a triangular mounting with the ribbon strut centrally positioned between two outer struts extending in opposite directions. Thus three resilient strut supports only would be used, and in this case a triangular mass could be supported thereby.

What I claim is:

1. An accelerometer comprising a base member; a resilient strut support means extending from said base member; a movable mass the size of which is so related to the dimensions of said resilient strut means that said mass is solely supported in, and solely restored after movement to a position of rest spaced apart from said base member by said resilient strut means; and a damping means to apply a force to said movable mass proportional to the velocity of the moving mass and in the opposite direction; said resilient strut support means comprising four crossed but separated resilient strut members disposed between said base member and said movable mass in substantially parallel planes, said strut members being arranged as two pairs of parallel wires with each pair of wires inclined in opposite directions and with each wire contained in a plane parallel to the planes of any of the other wires and arranged with the two oppositely inclined wires adjacent but separated one from the other and positioned towards either side of said movable mass with the axis of rotation extending through the points of intersection of the crossed strut members when in the rest position, said strut members creating an axis of rotation normal to said parallel planes containing said strut members and about which said movable mass may be vibrated through an arcuate path with said crossed resilient strut members resisting arcuate movement in any other direction.

2. An accelerometer as claimed in claim 1 wherein said support struts comprise beryllium copper wires between substantially four and sixteen thousandths of an inch in diameter and wherein said movable mass is supported so that it has a natural frequency between fifteen and sixty cycles per second.

3. An accelerometer as claimed in claim 2 wherein said wires are substantially eight thousandths of an inch in diameter and said natural frequency is at least thirty cycles per second.

4. An accelerometer as claimed in claim 1 wherein said movable mass includes a reflecting means comprising a glass cube having a spherical mirror formed on one face thereof.

5. An accelerometer as claimed in claim 1 wherein said movable means includes a reflecting means comprising a glass cube mounted with its faces normally disposed to the axis of rotation inclined at an angle of 45° thereto.

6. An accelerograph comprising three accelerometers according to claim 1 oriented to sense the North-South, East-West, and the vertical acceleration components respectively, and further including a radiation emitting means directing a recording beam towards reflecting means incorporated in said accelerometers, and recording means mounted to record the beam reflected by said reflecting means, thereby recording the movement of said accelerometers.

References Cited
UNITED STATES PATENTS

| 1,672,896 | 6/1928 | Kithil | 73—71.1 |
| 2,263,096 | 11/1941 | Marchand | 267—1X |
| 2,536,870 | 1/1951 | Burmist | 73—71.1 |
| 3,081,552 | 3/1963 | Reason | 33—215 |

FOREIGN PATENTS

| 783,104 | 9/1957 | Great Britain | 73—514 |

RICHARD B. WILKINSON, Primary Examiner

J. W. HARTARY, Assistant Examiner

U.S. Cl. X.R.

73—514; 267—1; 346—7